Jan. 18, 1955  E. P. SEXTON ET AL  2,699,973
LOAD COMPENSATING FLUID PRESSURE BRAKE APPARATUS
Filed Nov. 24, 1951

INVENTORS
Everett P. Sexton
Glenn M. Thomas
BY
Adelbert A. Steinmiller
ATTORNEY

2,699,973

LOAD COMPENSATING FLUID PRESSURE BRAKE APPARATUS

Everett P. Sexton, East McKeesport, and Glenn M. Thomas, Dravosburg, Pa., assignors to Westinghouse Air Brake Company, Wilmerding, Pa., a corporation of Pennsylvania Application November 24, 1951, Serial No. 258,038

4 Claims. (Cl. 303—22)

This invention relates to fluid pressure brake apparatus and more particularly to the type for use on railway vehicles.

In the co-pending application of Erik G. Erson, Serial No. 255,438, filed November 8, 1951 there is disclosed a fluid pressure brake apparatus embodying means including a strut device which is operable according to the distance between a sprung part and a non-sprung part of a vehicle, and hence according to the load on the vehicle, to vary the degree of braking of the vehicle according to whether it is empty, partially loaded or fully loaded. To accomplish this result three pipes, all subject to failure due to such as breakage, connect the strut device, which may be located adjacent the truck of the vehicle, to the brake controlling valve device which may be located adjacent the center of the vehicle.

The principal object of the invention is the provision of a novel brake apparatus for accomplishing the above results by the use of only one pipe connecting a strut device to the brake controlling valve device.

Other objects and advantages will become apparent from the following more detailed description of the invention.

Figure 1:
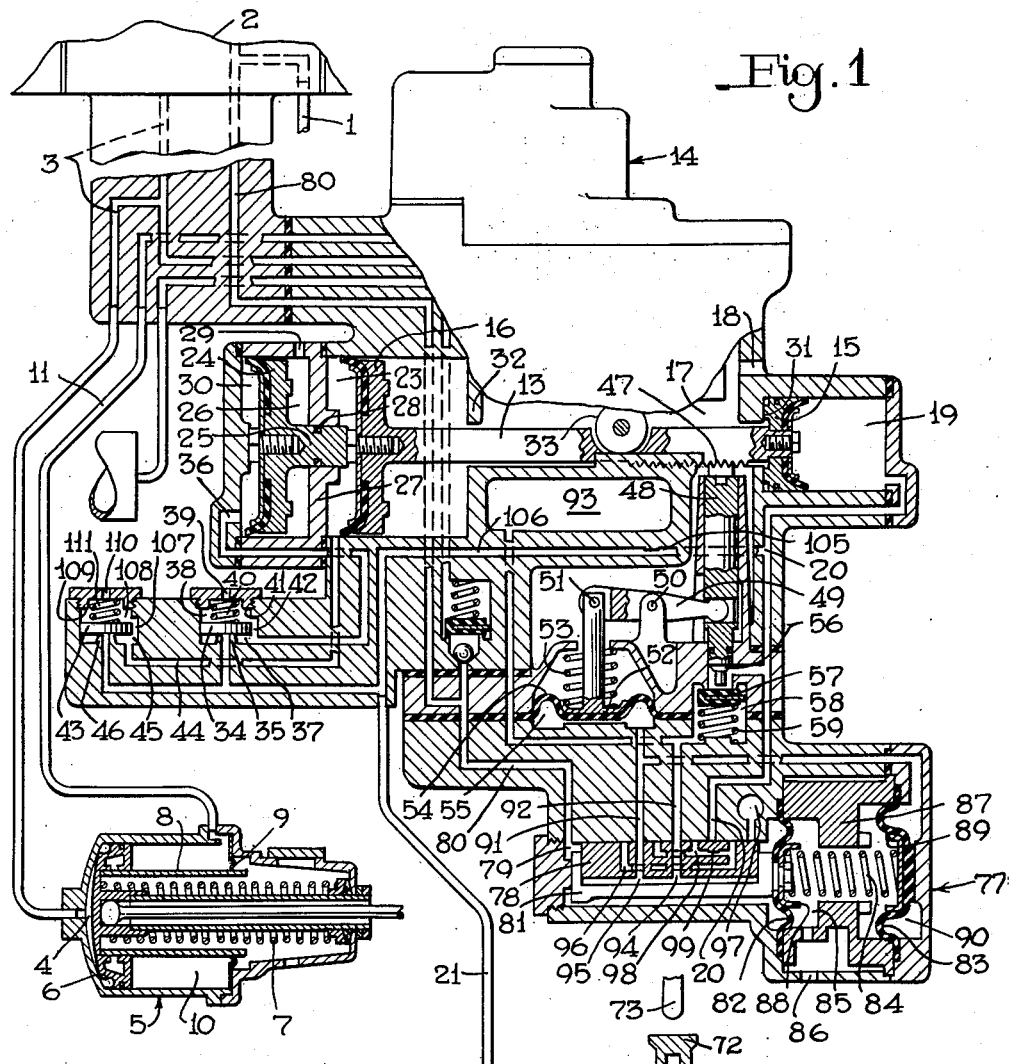
Figure 2:
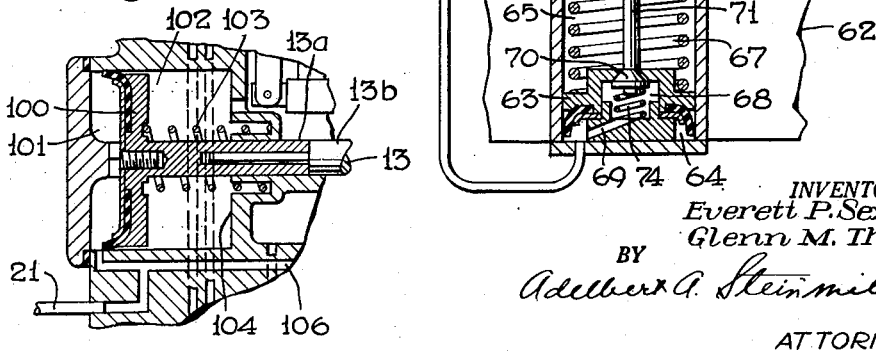

In the accompanying drawing, Fig. 1 is a diagrammatic view of a portion of a brake controlling apparatus embodying the invention; and Fig. 2 is a diagrammatic view of a portion of a brake apparatus embodying a modification of the invention.

Description—Fig. 1

The brake apparatus embodying the invention may be generally like that disclosed in the above referred to Erson application in view of which the disclosure in the drawing and the following description thereof are limited to only such as is essential to an understanding of the invention.

As shown in the drawing, the reference numeral 1 designates a brake pipe and reference numeral 2 designates a portion of a brake controlling valve device which is operative upon a reduction in pressure in said brake pipe to supply fluid under pressure to a passage 3 and upon restoration of pressure in said brake pipe to release fluid under pressure from said passage.

Passage 3 is connected to a pressure chamber 4 in a brake cylinder device 5 which comprises a brake cylinder piston 6 adapted to be subjected to pressure of fluid supplied through passage 3 to chamber 4 for actuating said piston in the direction of the right hand for applying brakes on a vehicle. A return spring 7 acting on the opposite face of piston 6 is adapted to move said piston to a brake release position, in which it is shown in the drawing, upon release of fluid under pressure from pressure chamber 4 by way of passage 3. Projecting from the side of piston 6 opposite pressure chamber 4 is a cylinder 8 having sliding contact with a casing carried packing ring 9, said cylinder cooperating with said ring, said piston and said casing to form a so-called load compensating chamber 10 which is open to a fluid pressure supply and release pipe 11. When a vehicle is empty fluid will be supplied by way of pipe 11 to chamber 10 at a pressure equal substantially to that in the pressure chamber 4 for opposing the latter pressure on brake cylinder piston 6 over an area less than exposed to pressure of fluid in chamber 4 whereby the braking force developed by the brake cylinder piston 6 for braking a vehicle will be limited to the differential in forces created by the pressures acting on the opposite faces of said piston. When a vehicle is fully loaded chamber 10 will be at atmospheric pressure by way of pipe 11 whereby the degree of braking of the vehicle will be governed solely by the pressure of fluid in chamber 4 acting on piston 6. For a partial load on a vehicle pressure of fluid provided through pipe 11 in chamber 10 will be limited in accordance with the degree of load whereby the braking force developed by piston 6 will be correspondingly limited.

Reference numeral 13 designates a brake control element adjustable to various positions corresponding to an empty vehicle, a fully loaded vehicle and a partially loaded vehicle, respectively, to control operation of a valve structure 14 for in turn controlling pressure of fluid in the load compensating chamber 10 of the brake cylinder device 5 according to the load on a vehicle, as will be described in greater detail later.

The brake control element 13 is in the form of a reciprocable rod to the opposite ends of which are connected pistons 15 and 16, respectively, piston 15 being of smaller diameter than piston 16. The element 13 is contained in a chamber 17 which is open to atmosphere through a vent 18 whereby the adjacent faces of the two pistons 15 and 16 are constantly subject to atmospheric pressure. At the opposite side of piston 15 is a pressure chamber 19 which is open to a passage 20. Passage 20 is also open through a choke 105 to a passage 106 connected by way of a pipe 21 to a strut device 22. At the opposite face of piston 16 is a pressure chamber 23.

A piston 24 which may be of the same diameter as piston 16 has a rod 25 projecting from one face thereof through a non-pressure chamber 26 at one side of piston 24 and a bore in the wall 27 separating said chamber from the pressure chamber 23 into the latter chamber where it engages the pressure face of piston 16. The rod 25 carries a sealing ring 28 having sealing and sliding contact with the wall of the bore through wall 27 for preventing leakage of fluid under pressure from chamber 23 to the non-pressure chamber 26 which is open to atmosphere through a vent 29. At the oposite face of piston 24 is a pressure chamber 30.

When, as will be later described, fluid under pressure is present in piston chamber 19 at a time when pressure of fluid in piston chambers 23 and 30 is substantially atmospheric, the piston 15 will be moved by pressure in chamber 19 in the direction of the left hand to a position defined by contact between said piston and a wall 31 in the casing for thereby positioning the brake control element 13 in what may be called an empty position which it is desired that said element 13 occupy when a vehicle is empty. When fluid under pressure is present in both chambers 19 and 30 and chamber 23 is vented, piston 24 being of greater area than piston 15, the pressure of fluid in chamber 30 will move the several pistons and thereby the brake control element 13 from its empty position until stopped by contact of piston 24 with the partition wall 27 in a position of element 13 which it is desired said element obtain for a partially loaded vehicle. Where fluid under pressure is present in both chambers 19 and 23, piston 16 being of greater area than piston 15 will move said pistons and the brake control element 13 in the direction of the right hand until the piston 16 contacts a wall 32 of the casing for defining a position for the brake control element 13 corresponding to a fully loaded vehicle.

The valve structure 14 is adapted to control the pressure of fluid in the load compensating chamber 10 of the brake cylinder device 5 according to the position of the brake control element 13 and, by way of example, may be like that disclosed in the Erson application hereinbefore referred to. To control such valve structure a fulcrum roller 33 is carried by the brake control element 13 for controlling operation of the valve structure 14 in such a manner as to equalize pressure of fluid in the brake cylinder compensating chamber 10 and pressure chamber 4 when braking an empty vehicle, to maintain chamber 10 at atmospheric pressure when fluid under pressure is supplied to chamber 4 for applying brakes on a fully loaded vehicle, and to provide in chamber 10 a pressure proportional to a partial load on the vehicle when fluid under pressure is supplied to pressure chamber 4 for thereby correspondingly limiting the degree of brake application on a partially loaded vehicle.

Reference numeral 34 designates a check valve in the form of a piston slidably mounted in a bore in the casing and arranged to cooperate at one side with an annular seat rib 35 for closing communication between passage 106 and a passage 36 connecting the partial load adjusting piston chamber 30 to an annular chamber or space 37 encircling said rib. Passage 106 opens through seat rib 35 to the cooperating face of said valve. At the opposite side of valve 34 is a chamber 38 which is open to atmosphere through a vent 39 and which contains a spring 40 urging said check valve against rib 35 with a force such as to require, for example, twenty-five pounds pressure of fluid in passage 106 to unseat the check valve. A seat 41 is provided for sealing engagement with the side of check valve 34 opposite the side which engages rib 35. A small leakage groove 42 in the check valve casing wall opens chamber 37 to chamber 38 to maintain piston chamber 30 at atmospheric pressure with the check valve in contact with rib 35. A like check valve 43 controls communication between passage 106 and a passage 44 connecting the full load adjusting piston chamber 23 to an annular chamber or space 45 encircling a seat rib 46 provided for engagement by said check valve, the passage 106 being open through said seat to the cooperating face of said check valve. Here also, a leakage groove 107 in the check valve casing wall opens chamber 45 to a chamber 108 at the opposite side of the check valve when in contact with rib 46. In chamber 108 a seat 109 is provided for contact by check valve 43 and said chamber which is open to atmosphere through a vent 110, contains a spring 111 acting on the check valve with a force such as to require, for example, forty pounds pressure of fluid in passage 106 to unseat said check valve to permit flow in the opposite direction.

The brake control element 13 is provided along one side within chamber 17 with a series of teeth 47 arranged to be engaged by teeth on the end of a plunger 48 which is slidably mounted in the casing at right angles to the axis of said element for locking said element in an adjusted position. One end of a lever 49 is connected to the plunger 48. Intermediate its ends the lever 49 is fulcrummed on a casing carried pin 50 while the opposite end is connected by a pin 51 to one side of a follower element 52. A spring 53 acts on the follower element 52 for operating the lever 49 to move the plunger 48 into locking engagement with teeth 47 on the brake control element 13 to hold said element in an adjusted position. The opposite side of follower 52 engages one side of a flexible diaphragm 54 at the opposite side of which is a pressure chamber 55. When fluid under pressure is present in chamber 55, as will be later described, the diaphragm 54 is adapted to deflect against spring 53 and actuate follower 52 and lever 49 to pull the plunger 48 out of engagement with the brake control element 13 to permit adjustment of said element according to the load on the vehicle, as above mentioned. When fluid pressure is released from chamber 55 the spring 53 is adapted to move the plunger 48 into engagement with the element 13 for holding it against movement, as just mentioned. After plunger 48 is moved out of locking engagement with brake control element 13 further movement thereof by diaphragm 54 and of an extension 56 of said plunger is adapted to unseat a check valve 57. The check valve 57 is contained in a chamber 58 and when unseated chamber 58 is placed in communication with passage 20. When the plunger 48 is in locking engagement with the brake control element 13 a spring 59 in chamber 58 is provided for seating the check valve 57.

The strut device 22 comprises a casing adapted to be mounted on any suitable sprung portion 62 of the vehicle and containing a vertically movable piston 63 at the lower face of which is a pressure chamber 64 open to the pipe 21. At the opposite face of piston 63 is a non-pressure chamber 65 open to atmosphere through a vent 66 and containing a spring 67 acting on said piston constantly urging it in the direction of pressure chamber 64. Within piston 63 there is formed a chamber 68 open to pressure chamber 64 through a passage 69 in the piston and containing a release valve 70 having a stem 71 extending through the non-pressure chamber 65 and to the exterior of the casing of the device. Outside of the device an adjustable foot piece 72 is secured to the valve stem 71 directly underneath any suitable unsprung portion 73 of the vehicle for contact therewith. A light bias spring 74 contained in chamber 68 acts on the valve 70 for urging it to its seat formed on the piston 63.

When, as will be later described, fluid under pressure is supplied to pipe 21 and thereby piston chamber 64 in the strut device 22, such pressure acting on piston 63 will move said piston against spring 67. The valve 70 and its stem 71 will move with the piston 63 until the foot piece 72 engages the unsprung part 73 of the vehicle which will then hold said valve against further movement, so that as piston 63 continues to move under increasing pressure of fluid in chamber 64 it will move out of contact with valve 70 to thereby permit release of fluid under pressure from chamber 64 to atmosphere by way of chamber 65. When a vehicle is empty the sprung part 62 of the vehicle and thereby the strut device 22 will be in such proximity to the unsprung part 73 of the vehicle that the release valve stem 71 will be stopped by said unsprung part after a certain small movement of piston 63 and then the release valve 70 will be unseated by further movement of said piston at a time when a relatively low pressure of fluid, such as fifteen pounds, is present in pipe 21 and pressure chamber 64 whereby the unseating of said valve will prevent the pressure of fluid in said pipe and chamber increasing above such degree. In case of a partially loaded vehicle the sprung part 62 of the vehicle and thereby the strut device 22 will occupy a lower position with respect to the unsprung part 73 than when the vehicle is empty thereby requiring a greater movement of piston 63 and a greater pressure of fluid in pipe 21 to effect such movement against spring 67 before unseating of the release valve 70. Under this partial load condition a fluid pressure such as twenty-five pounds in pipe 21 will be necessary to unseat the release valve 70 which will then operate to limit the pressure of fluid in said pipe to such a degree. In case the vehicle is fully loaded the sprung part 62 and strut device 22 will occupy a lowermost position with respect to the unsprung part 73 thereby requiring a greater movement of piston 63 and a correspondingly greater pressure of fluid in pipe 21 to effect such movement and unseat release valve 70; the unseating of said release valve then preventing further increase in pressure in pipe 21. For a fully loaded vehicle the pressure of fluid in pipe 21 may thus be limited to a degree such as thirty-five pounds.

Reference numeral 77 designates a cut-off valve device which comprises a slide valve 78 contained in a chamber 79 which is constantly open to brake pipe 1 by way of a passage 80. The slide valve 78 is mounted in a recess in a stem 81 one end of which is connected to the center of a diaphragm 82 subject on its one face to brake pipe pressure in chamber 79, the slide valve 78 being movable by and with said diaphragm. Spaced away from the diaphragm 82 is a coaxially arranged diaphragm 83 of larger diameter and interposed between and acting on said diaphragms in opposite directions is a coil spring 84. The spring 84 is contained in a chamber 85 which is open to atmosphere through a vent 86. Extending into chamber 85 is a stop element 87 arranged to be engaged on opposite sides by followers 88 and 89 for limiting deflection of the diaphragms 82 and 83, respectively, in the direction of said stop. Deflection of diaphragm 82 in the direction of chamber 78 is adapted to be limited by contact between one end of stem 81 and the casing which defines a cut-in position of the cut-off slide valve 78, while deflection of diaphragm 83 in the opposite direction is adapted to be limited by contact of the central portion thereof with the casing. At the outer face of diaphragm 83 is a pressure chamber 90 connected by a passage 91 to the latch diaphragm chamber 55 and to the seat of the slide valve 78. Also connected to the seat of the cut-off slide valve 78 are passage 20 and a passage 92 leading to the check valve chamber 58 and to a volume reservoir 93.

*Operation—Fig. 1*

With the brake apparatus void of fluid under pressure all parts will occupy the position in which they are shown in the drawing except the brake control element 13 which may be in any one of its three positions. Now upon supply of fluid under pressure to brake pipe 1 for charging the brake apparatus, such fluid will flow through passage 80 to valve chamber 79 in the cut-off valve device 77. With the cut-off slide valve 78 in the cut-in position, in which it is shown in the drawing, fluid from valve chamber 79 will then flow through a port 94 in said valve and passage 92 to check valve chamber 58 and to the volume reservoir 93 for charging same with fluid at the pressure in the brake pipe. At the same time fluid will also flow from the cut-off valve chamber 79 through a port 95 in slide valve 78 and passage 91 to diaphragm chambers 90 and 55.

When a sufficient pressure of fluid is thus obtained in chamber 55 it will deflect the diaphragm 54 against spring 53 and operate lever 49 to withdraw plunger 48 from locking engagement with the brake control element 13 followed by unseating of the check valve 57. Fluid under pressure now present in the volume reservoir 93 and reinforced by the supply of fluid from valve chamber 79 through port 94 will quickly flow into passage 20 and thence into piston chamber 19 wherein it will act on piston 15. With chambers 23 and 30 at the opposite faces of the adjusting pistons 16 and 24 vented to atmosphere past the respective check valves 43 and 34 at this time the pressure of fluid in chamber 19 acting on piston 15 will move the brake control element 13 to its empty position, unless already so positioned, in which it is shown in the drawing. Fluid under pressure supplied to passage 20 will also flow through choke 105 to passage 106 and thence to the underside of check valves 34 and 43 which, however, will remain seated for the time being under the pressure of springs 37 and 44, respectively. Fluid from passage 106 will also flow through pipe 21 to piston chamber 64 in the strut device 22 and when increased sufficiently will move the piston 63 against spring 67 until the release valve 70 is unseated by contact of the foot piece 72 with the unsprung portion 73 of the vehicle.

If the vehicle is empty this operation of the strut device 22 will limit the pressure of fluid in pipe 21 to a degree such as fifteen pounds which will be insufficient to unseat either of the check valves 34 or 43 so as to prevent supply of fluid under pressure to either of the adjusting piston chambers 23 or 30. With chambers 23 and 30 thus remaining at substantially atmospheric pressure through the vents 110 and 39, respectively, the brake control element 13 will remain in its empty position, corresponding to the empty condition of the vehicle, under pressure of fluid in chamber 19 acting on piston 15. In case the vehicle is partly loaded then the strut device 22 will operate to permit the pressure of fluid in pipe 21 to increase to a degree such as twenty-five pounds which acting on the check valve 34 will move said check valve against spring 40 out of contact with seat 35 and into engagement with its seat 41 whereupon fluid under pressure will flow from passage 36 to passage 20 and thence to chamber 30 wherein it will act on the partial load adjusting piston 24 to move it into contact with a partition wall 27. This operation of the partial load adjusting piston 24 will move the brake control element 13 from its empty position to its partial load position corresponding to the partial load on the vehicle. In case the vehicle is fully loaded the strut device 22 will operate to provide in pipe 21 a correspondingly higher pressure such as thirty-five pounds which acting on check valve 43 will unseat same from its seat 46 and move it against spring 111 into contact with its seat 109 whereupon fluid under pressure will flow from passage 106 into chamber 23 and act on the full load adjusting piston 16. The piston 16 will thereby be moved into contact with the casing partition wall 32 for moving the brake control element 13 against pressure of fluid in chamber 19 acting on piston 15 to its full load position corresponding to the full load condition of the vehicle.

It will now be seen that upon charging the brake apparatus the strut device 22 will operate to limit pressure of fluid in pipe 21 to a degree corresponding to the loaded condition of the vehicle whereby the brake control element 13 will be positively adjusted to its different positions for controlling operation of the valve structure 14 and thereby the pressure of fluid in the load compensating chamber 10 of the brake cylinder device as necessary to limit the degree of braking of a vehicle in accordance with the loaded condition thereof.

While the brake control element 13 is being adjusted according to the load on the vehicle, as above described, the pressure of fluid in brake pipe 1 and in valve chamber 79 of the cut-off valve device 77 will be gradually increasing and through port 95 in the slide valve 78 and passage 91 a corresponding increase in pressure will be occurring in chamber 90 at the outer face of the larger diaphragm 83 of said cut-off valve device. As the pressure of fluid in chamber 90 on diaphragm 83 thus increases said diaphragm will be gradually shifted against spring 84 for increasing the pressure of said spring against diaphragm 82 in accordance with the increase in brake pipe pressure in chamber 79 to hold the latter diaphragm and slide valve in their cut-in position, in which they are shown in the drawing. When finally the pressure in the brake pipe 1, valve chamber 79 and diaphragm chamber 90 becomes increased to a certain degree, such as forty pounds, deflection of the diaphragm 83 will be stopped by contact between the follower 89 and the stop element 87. Further increase in pressure in the brake pipe 1 and valve chamber 79 will then gradually deflect the diaphragm 82 against spring 84 until finally stopped by contact between the follower element 88 and stop 87 which defines a cut-out position of the slide valve 78.

When slide valve 78 thus obtains its cut-out position a port 96 therein will connect passage 91 to an atmospheric passage 97 while a port 98 in said slide valve will connect the passages 92 and 20 through a choke 99 to the vented port 96. Through the port 96 and atmospheric passage 97 the fluid under pressure will be promptly released from diaphragm chambers 55 and 90. This release of fluid under pressure from diaphragm chamber 55 will permit spring 53 to move plunger 48 into locking engagement with the brake control element 13 to hold it in the position to which it was previously adjusted, while the venting of fluid under pressure from diaphragm chamber 90 will permit said diaphragm to be moved to its right hand position by spring 84. The pressure of spring 84 against the diaphragm 82 will thereby be reduced to a degree which will permit the diaphragm 82 and slide valve 78 to be held in their cut-out position until the brake pipe pressure in chamber 79 is subsequently reduced to a relatively low degree, such as fifteen pounds. Through the passage 98 in the cut-out slide valve 78 the volume reservoir 93 will remain in communication with passage 20 and piston chamber 19 and the fluid pressure from both will be gradually released to atmosphere through the choke 99, the purpose of said choke being to so delay release of fluid under pressure from chamber 19 or chambers 23 or 30, as the case may be as to insure that the brake control element 13 will remain in its adjusted position until after the plunger 48 is moved into locking engagement with said element following which the pressure in said chambers will reduce through said choke to atmosphere by way of the atmospheric passage 97.

It will be apparent that as fluid under pressure is released from piston chamber 19, it will also release from piston chamber 30 or both chambers 30 and 23, in case the check valve 34 or both check valves 34 and 43 are in their upper seated position, through passage 106 and choke 105 to passage 20 and thence atmosphere. When the pressure in chamber 30 or both chambers 30 and 23 is thus sufficiently reduced the respective check valves 34, 43 will be returned to their lower seated positions whereupon any fluid remaining in said chambers will be vented through the respective leakage grooves 42, 107.

As pressure of fluid in passage 106 is reduced as above described the pressure in chamber 64 of the strut device 22 will reduce therewith through pipe 21 permitting piston 63 to gradually return to its normal position, in which it is shown in the drawing and which will be obtained upon substantial complete venting of said chamber. With the strut piston 63 thus back in its normal position the release valve 70 will be seated by spring 74 and the shoe 72 on the end of valve stem 71 will be pulled away from the unsprung portion 72 of the vehicle.

With the brake control element 13 adjusted in accordance with the load on the car and then locked in its adjusted condition by plunger 48, as above described, when fluid under pressure is supplied to passage 3 and thence to pressure chamber 4 in the brake cylinder device 5 the valve structure 14 will operate, as before mentioned, to limit the pressure of fluid in the load compensating chamber 10 according to the loaded condition of the vehicle in order that the vehicle will be braked according to such condition.

*Description—Fig. 2*

From the above description of the structure shown in Fig. 1, it will be noted that the strut device 22 will limit the increase in pressure of fluid in pipe 21 through choke 106 from passage 20 to a degree which will be directly in proportion to the load on a vehicle, that is, from a minimum pressure for an empty vehicle to a maximum pressure for a fully loaded vehicle. By the use of such pressure in the modification of the invention shown in Fig. 2, the brake control element 13 may be adjusted in accordance with an infinite number of different degrees of load limited only by the fineness of the teeth 47 on said element in the locking plunger 48, instead of limiting the adjustment of said element to only three positions as in the structure above described.

According to the modification of the invention the end of brake control element 13 opposite piston 15 may be connected to a larger piston 100 at one side of which is a pressure chamber 101 constantly open to pipe 21 while at the opposite side of said piston is a non-pressure chamber 102 open to chamber 17 and thence atmosphere by way of vent 18. In chamber 102 there is a spring 103 acting on the piston 100 urging it and thereby the brake control element 13 in the direction of the empty position. The pressure of spring 103 on the piston 100 and its pick-up characteristics will be so related to pressure of fluid obtained in pipe 21 that when the vehicle is empty said piston will remain in the position in which it is shown in the drawing to permit empty positioning of element 13 by piston 15 against any slight pressure of fluid which will be obtained in pipe 21 and chamber 101 by operation of the strut device 22. When the vehicle is fully loaded the pressure of fluid obtained in pipe 21 will just move piston 100 into contact with a partition wall 104 which will define the full load position of element 13. For any degree of load between empty and full load the pressure of fluid provided in pipe 21 of the strut device 22 will cause the piston 101 to assume a corresponding position between its empty and full load positions. Otherwise the operation of this modification of this invention is the same as described in connection with the structure in Fig. 1.

The brake control element 13 employed in this modification differs from that employed in the structure of Fig. 1, however, in that it is made in two parts 13a, 13b connected, respectively, to pistons 100 and 15. With the piston 15 in empty position and piston 100 in the position in which it is shown in the drawing the parts 13a, 13b will be in contact with each other to permit adjustment of the element 13 by the piston 100, as above described. However, upon movement of the cut-out valve device 77 to its cut-out position in which the part 13b will be locked by plunger 48, spring 103 will move piston 100 and part 13a relative to the locked part 13b, when in any position other than empty position, back to the position in which piston and part 13a are shown in the drawing. The purpose of thus making the element 13 in two parts is to prevent spring 103 being effective on the part 13b at the time of moving plunger 48 out of locking engagement with said part; otherwise said spring would act to slide the teeth 47 on the end of plunger 48 and damage said teeth.

*Summary*

It will now be seen that by the use of a strut device 22 only one pipe is required for controlling adjustment of a brake control element 13 to three or a greater number of positions corresponding to various degrees of load on a vehicle.

Having now described our invention, what we claim as new and desire to secure by Letters Patent, is:

1. In a brake apparatus for a vehicle having an unsprung part and a load carrying sprung part adapted to be spaced from said unsprung part a distance which varies according to the degree of said load, in combination, a brake control element adjustable to different positions corresponding to different degrees of load on the vehicle, fluid pressure controlled means responsive to different pressures of fluid for effecting adjustment of said element to, respectively, its different positions, a strut device comprising a casing carried by one of said parts, spring means, a piston in said casing adapted to be moved by fluid under pressure in a chamber against said spring means in the direction of the other vehicle part, and a release valve carried by and normally seated on said piston and movable therewith against said spring means and arranged to be unseated by engagement with the other vehicle part for releasing fluid under pressure from said chamber to thereby limit pressure of fluid in said chamber in accordance with the extent of movement of said valve with said piston and hence according to the load on said sprung part, a conduit for subjecting said fluid pressure controlled means to pressure of fluid in said chamber and means for supplying fluid under pressure to said chamber.

2. In a brake apparatus for a vehicle having an unsprung part and a load carrying sprung part adapted to be spaced from said unsprung part a distance which varies according to the degree of said load, in combination, a brake control element adjustable to different positions corresponding to different degrees of load on the vehicle, a first movable abutment operable by fluid under pressure in a first chamber to move said brake control element to one of its positions, second and third movable abutments operable by fluid under pressure in second and third chambers to move said brake control element to second and third positions, respectively, against pressure of fluid acting on said first abutment, fluid pressure regulating means carried by one of said vehicle parts and operable in response to fluid under pressure supplied to a fourth chamber into contact with the other vehicle part to limit the pressure in said fourth chamber to a degree which varies according to the extent of such movement and hence the load on the vehicle, valve means operable by a chosen pressure of fluid in said fourth chamber to supply fluid under pressure to act on said second movable abutment, other valve means operable by a higher chosen pressure of fluid in said fourth chamber to supply fluid under pressure to act on said third movable abutment, and means for supplying fluid under pressure to said first and fourth chambers.

3. In a brake apparatus for a vehicle having an unsprung part and a load carrying sprung part adapted to be spaced from said unsprung part a distance which varies according to the load on the vehicle, a brake control element having a plurality of different positions corresponding to different degrees of load on the vehicle, first movable abutment means adapted to be operated by fluid under pressure in a first chamber to move said element to one of its positions, second movable abutment means adapted to be operated by fluid under pressure in a second chamber to move said element to another one of its positions, a pipe, valve means for supplying fluid under pressure to said first chamber and to said pipe, a strut device adapted to be carried by one of said vehicle parts and operated by pressure of fluid in a chamber open to said pipe into engagement with the other vehicle part for limiting pressure in said pipe in accordance with the load on the vehicle, valve means controlled by pressure of fluid in said pipe and operative in response to a chosen pressure therein to supply fluid under pressure from said pipe to said second chamber, and means for actuating said valve means to open said second chamber to a vent in response to a lower pressure of fluid in said pipe.

4. In a brake apparatus for a vehicle having an unsprung part and a load carrying sprung part adapted to be spaced from said unsprung part a distance which varies according to the load on the vehicle, a brake control element having a plurality of different positions corresponding to different degrees of load on the vehicle, first movable abutment means adapted to be operated by fluid under pressure in a first chamber to move said element to one of its positions, second movable abutment means adapted to be operated by fluid under pressure in a second chamber to move said element to another one of its positions, a pipe, valve means for supplying fluid under pressure to said first chamber and to said pipe, a strut device adapted to be carried by one of said vehicle parts and operated by pressure of fluid in a chamber open to said pipe into engagement with the other vehicle part for limiting pressure in said pipe in accordance with the load on the vehicle, other valve means controlled by pressure of fluid in said pipe and operative in response to a chosen pressure therein to supply fluid under pressure from said pipe to said second chamber, a communication by-passing said other valve means for releasing fluid under pressure from said second chamber to said pipe, and a check valve in said communication for preventing flow of fluid under pressure therethrough from said pipe to said second chamber.

References Cited in the file of this patent

UNITED STATES PATENTS

| | | |
|---|---|---|
| 2,364,927 | Sudduth | Dec. 12, 1944 |
| 2,534,622 | Pickert | Dec. 19, 1950 |